United States Patent Office 2,890,750
Patented June 16, 1959

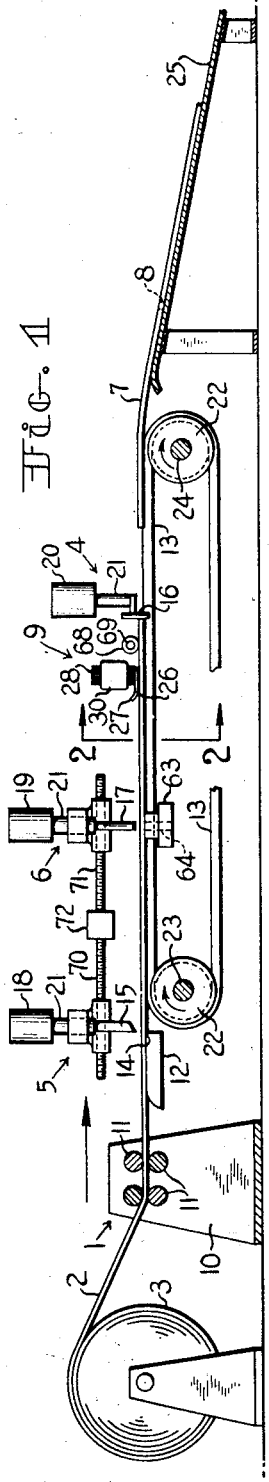
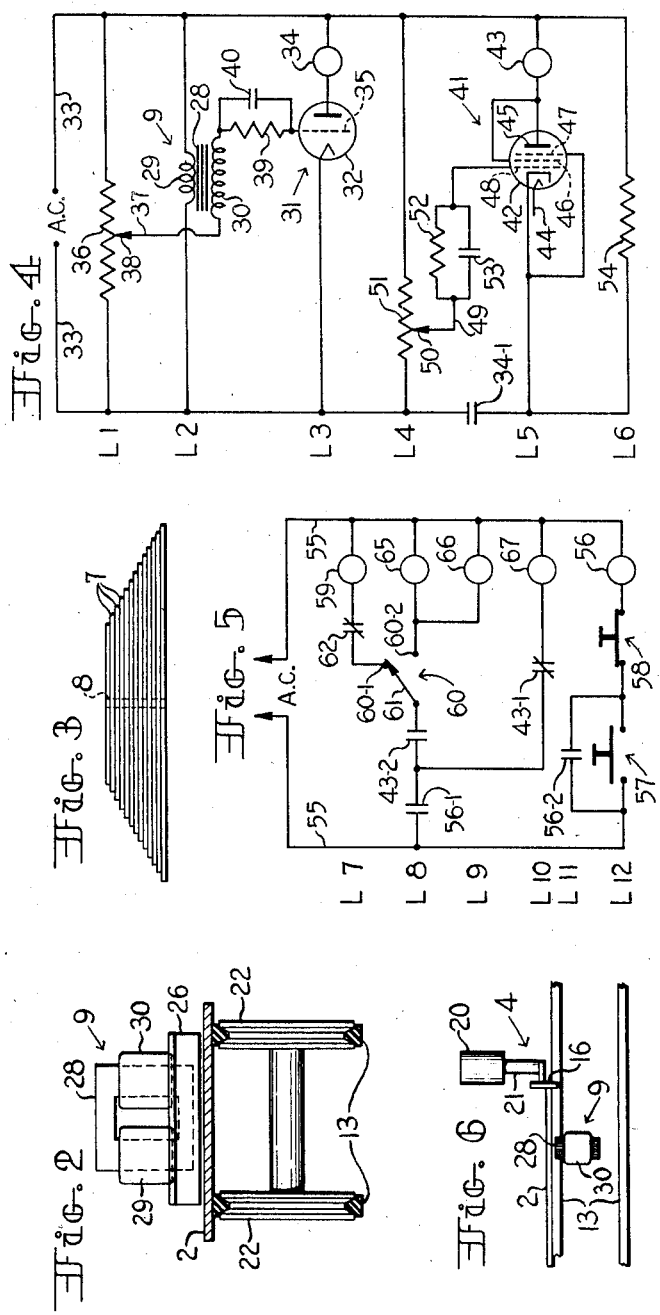

2,890,750

SHEAR MACHINE WITH ELECTROMAGNETICALLY OPERATED CONTROL RESPONSIVE TO METALLIC STRIP BEING FED TO SHEAR

Andrew F. Depken, Pittsburgh, Pa., assignor to McGraw-Edison Company, a corporation of Delaware Application October 1, 1956, Serial No. 613,122

15 Claims. (Cl. 164—49)

This invention relates to a shear machine with an electromagnetically operated control which is adapted to form a series of strip laminations of various lengths.

In the fabrication of laminated members, such as rectangular transformer cores, a series of progressively longer, or shorter strip laminations are superimposed upon one another and then wrapped into a rectangular core. An opening is normally formed in the longitudinal center of each lamination to receive a stacking guide for assembly of the laminations.

One manner of forming laminations is to feed a continuous strip of metal into a machine which rapidly and automatically cuts off and suitably punches a series of individual laminations of varying lengths. The laminations are ordinarily relatively thin and consequently if the weight of the incoming stock strip is used to start the machine, the switches must be extremely sensitive. Although photoelectric means may be employed to obviate this difficulty, the photoelectric means is subject to burn out as well as breakage due to machine vibration and the like.

In accordance with the present invention, the entrance of a continuous or elongated metal strip into a shearing machine changes the magnetic state of an electromagnetic sensing device to establish an electrical control signal. After a suitable time delay to insure correct positioning of the incoming strip, the electrical control signal energizes suitable devices to start the successive shearing of the elongated strip into separate individual strips or laminations. After each lamination or strip thus formed is removed from the machine the electromagnetic device then returns to standby until a new strip again changes its magnetic condition. Means are provided to insure that the incoming elongated strip does not operatively effect the electromagnetic device until the immediately preceding formed lamination or strip has been sufficiently removed to prevent interference with further operation of the machine.

The present invention provides a simple and accurate control for an automatic shearing machine.

The drawing furnished herewith illustrates the best mode presently contemplated for carrying out the invention.

In the drawing:

Figure 1 is a schematic illustration of a progressive shear and punch machine for forming individual laminations of varying lengths;

Fig. 2 is a view taken on line 2—2 of Fig. 1;

Fig. 3 is a side elevational view of a stack of laminations such as may be cut by the mechanism of Fig. 1;

Fig. 4 is a schematic circuit diagram of a control for the machine;

Fig. 5 is a schematic circuit diagram of an actuating circuit for the machine; and Fig. 6 is a fragmentary view of a shear and punch device showing a modification of the embodiment of Figure 1.

Referring particularly to Figs. 1 and 2 of the drawings, the shear and punch assembly or machine comprises, in general, a feed mechanism 1 adapted to uncoil a continuous metal strip 2 of relatively thin metal stock from a storage reel 3 and feed it into the machine for shearing the strip into laminations for use in a magnetic core structure. The strip 2 is fed longitudinally into the machine until it engages a stop 4 disposed in line with a shear 5 and a punch 6 which simultaneously shear off a lamination 7 from the continuous strip 2 and punch a hole 8 in the center of the lamination, respectively. An electromagnetic pickup 9 is disposed adjacent the infeed side of the stop 4 and provides an electrical signal or control which is connected to initiate actuation of the shear 5 and the punch 6 at the instant the strip 2 reaches the stop 4.

The feed mechanism 1 comprises a base 10 supporting a plurality of upper and lower drive rolls 11 which are adapted to frictionally grip the continuous strip 2 to unreel it from a reel 3 and advance it into the machine and into engagement with the stop 4. The drive rolls 11 also straighten the strip. A suitable drive device, such as a motor, not shown, is coupled in driving relation with the drive rolls 11.

As the continuous strip 2 passes between the drive rolls 11, it moves onto a support bed or table 12 of the shear 2 which is disposed adjacent the infeed end of the machine and then onto a pair of longitudinally revolving endless belts 13. The trailing edge 14 of the table 12 is disposed beneath and in cutting relation with an upper movable knife 15 of the shear 5.

The feed rolls 11 longitudinally advance the strip 2 toward the stop 4 which is mounted between the upper parallel flights of the supporting belts 13. Stop 4 includes a vertically movable plate 16 which in its stop position, as shown in Fig. 1, is disposed in the same plane as that of the incoming strip 2 to positively position the strip with respect to the shear 5 and the punch 6 for the shearing and the punching operation. At the instant strip 2 abuts movable plate 16, the shear 5 and punch 6 are rapidly actuated to depress the shear knife 15 and a suitable punching element 17 of punch 6 to form the lamination 7. After the lamination 7 is thus formed, plate 16 together with shear knife 15 and punch element 17 automatically move vertically upwardly to allow the cut and punched lamination 7 to pass under it and out of the machine.

The frictional engagement of the feed rolls 11 is set to provide a continuous positive infeed of the strip 2. When the strip 2 abuts the stop 4 and the knife 15 drops to sever the strip 2, a slack loop, not shown, forms in the incoming strip 2 between the feed rolls 11 and knife 15 for the momentary period the knife is in the path of the strip 2.

The movement of the shear knife 15, the punch element 17, and the plate 16 are controlled by the respective pistons 18, 19 and 20, each having a piston rod 21 connected to the respective element. The pistons are fluid operated and have suitable air valves, not shown, connecting them to a fluid source, not shown, by a suitable control mechanism as hereinafter described.

After lamination 7 is formed, the lamination is rapidly advanced out of the machine by the endless belts 13.

As shown in Fig. 2, the belts 13 are transversely spaced somewhat less than the width of the continuous strip and support the strip 2 as it advances through the machine. The belts 13 are of the conventional V-shaped variety and are each supported on a pair of corresponding grooved sheaves 22 which are longitudinally spaced in the path of the incoming strip. One set of sheaves 22 is mounted on a rotary shaft 23 immediately adjacent the shear 5 to accept the incoming strip 2 as it advances past the shear. The opposite set of sheaves 22 is mounted on a rotary shaft 24 disposed rearwardly of the stop 4. The shaft 24 is driven from a motor, not shown, to drive the belts 13 in a direction to carry the formed lamination 7 from the machine to a suitable stacking table 25 or the like. The linear speed of the belts 13 is maintained substantially greater than the infeed speed of the incoming continuous strip from rolls 11 so that the lamination upon being formed moves forwardly away from the advancing edge of the continuously moving strip.

As the forward end of the incoming continuous strip 2 approaches the stop plate 16 it passes beneath a stainless steel guide or guard 26 immediately above which the electromagnetic pickup or detector 9 is mounted. The guard 26 is an arcuate plate member which is somewhat wider than the detector 9, as shown in Fig. 2, and which extends upwardly as at 27 at its forward side. Guard 26 prevents the incoming strip 2 or the outgoing lamination 7 from striking the detector 9.

The detector 9 is adapted to establish an electrical control signal in response to the presence of the metal strip 2 and start the shear 5 and the punch 6 in synchronism with the engagement of the strip and the stop plate 16, as more fully described hereinafter with respect to the circuit of Fig. 4.

Referring to Figs. 1 and 2, the electromagnetic pickup 9 comprises a rectangular magnetic frame 28 with the lower portion of the frame disposed immediately adjacent the upper surface of the guide 26 and therefore in relatively close proximity to the upper surface of the strip.

A primary coil 29 is wound on one member of frame 28 and a secondary coil 30 is wound on a second member of the frame to magnetically couple the coils. The primary coil 29 is connected to a suitable power source such as the conventional 110 volt A.C. power lines and induces a voltage in the secondary winding. The output of secondary winding 30 is connected in a triggering circuit 31 shown in Fig. 4 which fires when the secondary voltage is at a predetermined value. In the absence of the metal strip 2, the secondary voltage output is insufficient to fire the triggering circuit. In the presence of the strip 2, the flux leakage between the primary coil 29 and the secondary coil 30 is reduced and the secondary output voltage increases, which then fires the triggering circuit 31.

Referring to Fig. 4, the illustrated triggering circuit comprises a triode vacuum tube 32 in line L3 connected to control power lines 33 in series with a relay 34 also in line L3. A control grid 35 of the vacuum tube 32 is normally negatively biased to a point just below the firing voltage of the tube. This bias voltage is obtained by connecting to the grid 35 a potential which is the sum of a predetermined voltage taken from a voltage divider 36 in line L1 and the voltage taken from the secondary winding 30 in series with the voltage divider. The primary winding is shown as being in line L2 connecting it to the power lines 33. The voltage divider 36 is connected across the power lines 33 by line L1 and has a grid lead 37 connected to the divider by a tap 38 and to one end of winding 30. A paralleled resistor 39 and capacitor 40 are connected to the opposite end of winding 30 and to grid 35 to be in series with the biasing voltages. When the tube 32 conducts, grid current flows during the positive half cycle and charges the capacitor 40 which discharges during the negative half cycle and maintains conduction in the tube during the negative cycle of the signal.

When the tube 32 fires, as when the voltage output of winding 30 rises by reason of the presence of strip 2 beneath guard 26, the relay 34 is energized and closes a set of associated contacts 34—1 in one power lead 33 between lines L–4 and line L–5. When the contacts 34—1 close, an electronic timer 41 begins to operate.

The timer 41 is a conventional electronic timer including a vacuum tube 42 connected to the power line 33 in series with a control relay 43 in line L–5. The cathode 44 of tube 42 is connected to the power line containing contacts 34—1 and the anode 45 of tube 40 is connected to the other power line through relay 43. A screen grid 46 in tube 42 is tied to the anode 45 and a suppressor grid 47 is tied to the cathode 44 in a conventional connection. A biasing voltage is applied to a control grid 48 by a grid lead 49 connected to a movable tap 50 of a voltage divider 51 in line L–4, which is connected directly across the power lines 33. The triggering contacts 34—1 are connected in the one power line 33 between the lines L–4 and L–5 such that the voltage divider 51 is connected to the power lines 33 regardless of the condition of contacts 34—1.

A paralleled resistor 52 and a capacitor 53 are connected in the grid lead 49 and condition the timer for delayed firing of the tube 42. When the contacts 34—1 are open, the capacitor 53 is charged by grid rectification through the tube 42 and a small by-pass resistor 54 which is connected across the power lines 33 after the contacts 34—1. Thus, during each positive half cycle of the current through the divider 51, current also flows from the line 33 shown to the left in Fig. 4 through the resistor 51 to tap 50 and then through the resistor 52 in grid lead 49 and from grid 48 to cathode 44 and back to the power line 33 shown to the right in Fig. 4 through the resistor 54. As the resistor 54 is small, the voltage taken from the voltage divider 51 appears across the resistor 52 and charges the capacitor 53 to the crest value of the A.C. voltage. The rectifying action of the grid-cathode circuit prevents the reverse flow of current through the resistor 52, and the capacitor 53 remains charged as long as the contacts 34—1 remain open and current flows in line 33.

When the contacts 34—1 close and connect the cathode 44 to the line 33, the grid 48 becomes negative with respect to the cathode 44 and blocks the flow of current through the grid.

When the contacts 34—1 first close, the tube 42 cannot conduct because of the charge on the capacitor 53. The capacitor 53 discharges through the resistor 52 and after a predetermined time, the capacitor 53 is sufficiently discharged and the voltage on the capacitor 53 can no longer prevent conduction. The tube then conducts.

Conduction through the tube 42 energizes the main control relay 43 which opens contacts 43—1 and closes contacts 43—2 connected in line L–10 and line L–8, respectively, of a suitable actuating circuit such as shown in Fig. 5 for the stop 4, shear 5 and the punch 6, and described hereinafter. The time delay in the actuation of relay 43, which is inserted by the operation of the capacitor 53, is precisely coordinated with the time taken for the strip 2 to move past the detector 9 and into engagement with the stop 4 after the trigger circuit 31 fires.

Referring to Fig. 5, the illustrated actuating circuit includes a set of main lines 55 connected to a suitable source of alternating current, not shown.

The relay 43, when energized, opens normally closed contacts 43—1 in line L–10 and closes normally open contacts 43—2 in line L–8, which are connected in parallel to the left hand control line 55 through a set of normally open contacts 56—1 in line L–8.

The contacts 56—1 are controlled by a relay 56 in line L–12 and the relay 56 is energized by manually closing a starting button 57 in line L–12. The relay 56 also closes a set of contacts 56—2 in line L–11 which are connected in parallel with the push button 57 and lock the relay 56 in circuit. A manual stop button 58 is provided in line L–12 to break the circuit to the relay 56 and thereby stop the machine.

When the relay 56 is locked to the control lines, it maintains the contacts 56—1 in line L–8 closed and provides current to the contacts 43—2 in line L–8 and to the contacts 43—1 in line L–10.

When relay 43 is energized and closes the contacts 43—2 in line L–8, it completes a series circuit to a relay 59 in line L-7 through a switch 60 having a switch arm 61 connected in line L-8 and having a contact 60—1 in line L-7 and through a set of normally closed contacts 62. The relay 59 controls the admission of air to the pistons 18 and 19 to simultaneously depress the knife 15 and the punching element 17.

The movable knife 15 in cooperation with the table edge 14 severs the strip 2 and forms a lamination 7.

The punching element 17 cooperates with a suitable die 63 disposed immediately beneath the strip 2 and between the belts 13 to form the opening or hole 8. The die 63 is provided with a suitable opening 64 to receive the element 17.

As the knife 15 drops, it actuates the limit switch 60 and moves the arm 61 from contact 60—1 in line L-7 to a contact 60—2 in line L-8. This disconnects the relay 59 in line L-7 from lines 55. This also completes a circuit to a relay 65 in line L-8 and also to a latch relay 66 in line L-9.

The relay 65 in line L-8 controls the admission of air to the pistons 18 and 19 to actuate them and simultaneously raise or retract the attached shear knife 15 and punch element 17 to their initial position.

The relay 66 in line L-9 opens the contacts 62 in line L-7 to prevent energization of relay 59 in line L-7 when the switch arm 61 returns to the contact 60—1 upon raising of knife 15. The relay 66 also controls the admission of fluid for the stop piston 20 to raise the stop plate 16 from the path of the lamination 7 and allow the lamination to advance through the discharge end of the machine under action of the endless belts 13.

As previously described, when the shear 5 severs a lamination 7 from the strip 2, the belts 13 carry the lamination out of the machine at a greater speed than the incoming strip. Consequently, an air gap or space arises between the incoming strip 2 and the lamination 7 as the latter is moved by the belts 13. The relative speed of the belts 13 and the incoming strip 2 is such that the air gap presented to the electromagnetic detector 9 is sufficiently long to reset the trigger circuit 31 which de-energizes the relay 34 and thereby opens the contacts 34—1. The electronic timer 41 is thereby disconnected from the power lines 33 and is reset for time delay action by grid rectification, as previously described, for a subsequent cycle of operation.

When relay 43 is de-energized, the contacts 43—1 close and complete the circuit to a relay 67 in line L-10. The relay 67 controls the admission of fluid to the stop piston 20 to lower the stop-plate 16 into the path of the incoming strip. The lamination 7 will have passed the stop plate 16 due to the short distance between the detector and the stop plate.

The relay 67 also closes the contacts 62 which were opened by the relay 66 and thereby allows subsequent energization of relay 59. The relay 59 is not energized when contacts 62 close even though switch arm 61 has returned to engagement with the contact 60—1 as the relay contacts 43—2 are open. When relay 43 is again energized, the contacts 43—2 close and complete the circuit to relay 59.

Thus, the control circuit and the actuating circuit are placed in the initial position for the next cycle of operation.

A pressure roller 68 is rotatably mounted on a shaft 69 between the detector 9 and the stop 4 and biases the lamination 7 against the belts 13 to prevent slippage therebetween. This insures that the formed lamination is advanced out of the machine at the linear speed of the belts 13 and consequently insures the formation of a sufficient air gap between the incoming strip 2 and the formed lamination to effect resetting of the timer 41.

As illustrated in Fig. 3, the machine forms a series of individual laminations 7 from the stock 2 which are of progressively longer or shorter lengths such that when the punched holes 8 are aligned, as shown, a generally trapezoidal stack with oppositely and equally tapered sides is formed. The stacked laminations 7 may be wrapped to form a transformer core, not shown, with each lamination being closed upon itself, as described in the copending application of John J. Zimsky, entitled Magnetic Core and Its Method of Construction, Serial No. 535,202, filed September 19, 1955, and assigned to a common assignee with the present invention.

For the purpose of adjusting the machine to cut successive laminations of the necessary different lengths the shear 5 is mounted on a lead screw 70 which is appropriately turned after each shear actuation. The lead screw 70 may be turned in any suitable manner such as by a stepping motor, not shown, which is energized in response to the retraction of the shear knife 15.

The punch 6 is also moved to the center of each successive lamination to provide the stacking opening in the same relative position. The punch 6 is mounted on a lead screw 71 which is adapted to move the punch and position it in the center of the larger lamination. In order to center the holes 8, the punch necessarily moves exactly one-half of the distance of the movement of the shear 5. This may be accomplished in any desired manner such as by gearing the lead screws 70 and 71 through a gear box 72 to be simultaneously turned an equal increment and making the pitch of the screw 70 for the shear 5 twice the pitch of the screw 71 for the punch 6.

The operation of the apparatus is summarized as follows:

Power is supplied to the various drive means as well as the main control and timing circuits.

When power is supplied to the timing circuit of Fig. 4, the primary coil 29 of the detector 9 induces a voltage in the secondary coil 30 which is insufficient to fire the tube 32. The relay contacts 34—1 in the power line 33 are open and the timer tube 42 is time delayed biased through grid rectification.

The drive rolls 11 advance the strip 2 into the machine and toward the stop 4. As the strip approaches the detector 9, the magnetic path between the primary coil 29 and the secondary coil 30 improves and the induced voltage in the secondary coil 30 increases. When the strip 12 reaches the detector 9 or is a predetermined distance therefrom, the increased secondary voltage is sufficient to fire the trigger tube 32. Firing of tube 32 energizes relay 34 which closes the contacts 34—1 and thereby completes the circuit of the timer tube 42 to the power lines 33.

Tube 42 does not fire or conduct immediately because of the grid bias established through grid rectification. The time delay inserted is the same as the time required for the forward edge of the incoming strip 2 to move from detector 9 to the stop plate 16. The tube 42 then fires and energizes the relay 43 which completes the operating circuit to the shear 5, the punch 6 and the stop 4. The tube 42 continues to fire until the contacts 34—1 open and disconnect the tube from the power lines 33.

Simultaneously, the shear 5 and punch 6 operate to form the lamination and piston 20 of stop 4 raises the stop plate 16 to permit discharge of the formed lamination. The operation of the shear punch, and stop, are both practically simultaneous and extremely rapid as the feeding of the strip 2 is continuous and relatively rapid.

The formed lamination 7 is longitudinally advanced out of the machine by the high speed belts 13 and discharged onto the stacking platform. The removal of the lamination 7 is more rapid than the infeed of the strip 2 and an air gap is formed therebetween.

This air gap changes the coupling of the primary coil 29 and the secondary coil 30 to a non-energizing relation and the tube 32 stops conducting current when the rear end of lamination 7 passes from beneath detector 9, whereupon relay 34 is de-energized and contacts 34—1 open.

The opening of contacts 34—1 stops conduction through the timer tube 42 and the relay 43 is then de-energized. When relay 43 is de-energized, the stop plate 16 returns to the down position in the path of the incoming strip and the machine is conditioned for the next cycle.

As the shear 5 and punch 6 return to the retracted or starting position, and while the formed lamination 7 is being removed, the lead screws 70 and 71 for the shear and punch, respectively, are actuated to reset the shear and the punch for the next operation upon the next size lamination.

The incoming strip 2 again approaches the detector 9 which fires the trigger circuit 31 to initiate the next cycle.

A series of laminations of varying lengths is thus progressively formed. After the first and all subsequent laminations of a set are completed, the machine is reset to the initial starting position, either manually or automatically, and a next set of laminations is automatically formed.

A modification of the invention is illustrated in Fig. 6 of the drawing showing a different placement of the detector. Fig. 6 is a fragmentary view of the schematic assembly shown in Fig. 1 illustrating the modified position of the detector with similar elements in Figs. 1 and 6 having the same number.

Referring to Fig. 6, the detector 9 is disposed beneath the strip 2 with the upper surface of the rectangular detector core or frame 28 disposed in close proximity to the undersurface of the strip between belts 13. The non-magnetic shield or guide 26 is eliminated as the belts 13 prevent any contact between the strip and the detector 9.

With this placement of the detector 9, the magnetic field established by the primary winding 29 attracts the strip 2 and biases the strip toward the conveying belts 13 to reduce slippage between the cut lamination and the conveying belts. Consequently, the biasing roller 68 of Fig. 1 is not needed to move the lamination away from the newly formed end of the strip.

The operation of the embodiment of the invention shown in Fig. 6 is the same as that shown in Fig. 1 except for the manner of positively biasing the formed lamination onto the belts 13.

The present invention provides a rugged and accurate detector for automatically actuating a shearing machine.

Various modes of carrying out the invention are contemplated as being within the scope of the following claims particularly pointing out and distinctly claiming the subject matter which is regarded as the invention.

I claim:

1. In a machine for forming a plurality of separate strips of metal from a long metal strip traveling through said machine in a predetermined path, shear means disposed in said machine along the path of travel of said elongated strip, electromagnetic means located along the path of travel of said elongated strip and spaced longitudinally a predetermined distance from said shear means, said electromagnetic means being adapted to sense the presence of said strip and to establish a control signal in response thereto, stop means disposed in the path of the strip in spaced relation to said shear means, time delay means actuated by said signal and adapted after a predetermined time delay to send out a second electrical signal to actuate the shear means to shear a separate strip of metal of the desired length as determined by said stop means from said elongated strip, means responsive to actuation of the shear means to move the stop from the path of the elongated strip, and means to separate the separate strip from the elongated strip.

2. In a machine for forming a plurality of separate strips of metal from a long metal strip traveling through said machine in a predetermined path, shear means disposed in said machine along the path of travel of said elongated strip, electromagnetic means located along the path of travel of said elongated strip and spaced longitudinally a predetermined distance from said shear means, said electromagnetic means being adapted to sense the presence of said strip and to establish a control signal in response thereto, time delay means actuated by said signal and adapted to send out a second electrical signal to actuate the shear means to shear a separate strip of metal of the desired length from said elongated strip, and means to adjust the shear and electromagnetic means relative to each other after each actuation of said shear means to change the length of the successive strips to be sheared from said elongated strip.

3. In combination in a shearing machine adapted to form a plurality of separate strips from a metal strip of indefinite length, means to continuously feed the strip into the machine, stop means disposed in spaced relation to the strip entrance of the machine and adapted to position the strip within the machine, electromagnetic means disposed between the entrance to the machine and stop means and adjacent the path of the incoming strip, said electromagnetic means being adapted to sense the presence of said strip and to establish a control signal in response thereto, time delay means actuated by said signal and adapted to send out a second electrical control signal after a period of time at least as long as the time for the forward edge of the strip to move from said electromagnetic means into stop relation with said stop means, and means responsive to said second electrical control signal to actuate the shear to form a separate strip from said strip.

4. In combination in a shearing machine for successively cutting laminations of varying lengths from a single continuous metallic strip, means to feed the strip into the machine, movable shear means, stop means disposed in the path of the incoming strip to position the strip with respect to the shear means, means responsive to formation of a lamination to index the shear means with respect to the stop means for the subsequent lamination, a resettable electrical control circuit for said shear means and said stop means, said control circuit being adapted to automatically open at the end of each shearing cycle, electromagnetic means disposed in spaced relation to the stop means and adjacent the path of the incoming strip, said electromagnetic means being responsive to the presence of the incoming strip to establish a control signal, time delay means connected to said electromagnetic means for energization by said control signal and connected to said resettable control circuit to reset the control circuit when in a de-energized state and to actuate the control circuit when in an energized state after a predetermined time delay to permit the strip to abut the stop means, and means to remove the formed lamination more rapidly than the incoming strip to form an air gap therebetween which passes over said electromagnetic means, said control signal being removed by the presence of the air gap to return the time delay means to a de-energized state and thereby reset the control circuit.

5. In combination an apparatus to divide an elongated metallic strip by successively severing individual strips from the end of the elongated strip, feed means adapted to longitudinally move the elongated strip, severing means disposed adjacent the path of the strip and movable transversely of the strip to separate the strip, stop means disposed in the path of the strip to position the strip with respect to the severing means, an electromagnetic detector disposed between said severing means and said stop means and adjacent the path of the strip and establishing a control signal in response to predetermined position of the strip and the detector, an actuating circuit for said severing means including resettable stop means responsive to a cycle of operation to latch the severing means in a stop position, a timing circuit energized by said actuating signal and operatively connected to said actuating circuit to initiate a cycle of operation in response to said acuating signal and to reset said stop means for another cycle in response to discontinuance of said control signal, and means to longitudinally move the severed strip at a sufficiently greater speed then the feed of the incoming strip to form an air gap therebetween which passes over the electromagnetic detector and discontinues the control signal whereby said timing circuit resets the resettable stop means for the next succeeding cycle.

6. Apparatus for successively severing a series of individual strips from a continuous metallic strip, comprising in combination, means to continuously advance the continuous strip in a longitudinal horizontal plane at a predetermined infeed speed, a vertically movable knife disposed above said moving strip and adapted to reciprocate vertically to cut the strip, an actuating circuit operatively associated with the knife to cyclically control movement of the knife and having resettable latching means responsive to a cycle of knife operation to open the actuating circuit until reset, a transformer means disposed adjacent the path of the strip in rearwardly spaced relation to said shear means and having a first winding connected to a source of power and a second winding inductively coupled to said first winding to provide a control signal having one level in the presence of the strip and a second level in the absence of the strip, circuit means connecting said second winding and said actuating circuit to initiate a cycle of knife movement in response to the first of said control signal levels and to reset the latching means in response to the second of said control signal levels, and means to longitudinally advance the severed strip at a speed sufficiently greater than the strip infeed speed to form an air gap between the severed strip and the continuous strip, the said air gap being effective to return the control signal to said second level.

7. A shearing machine having electromagnetic control apparatus which is adapted to successively sever the end of an elongated metallic strip of indefinite length which is continuously and longitudinally fed at a constant speed into the machine whereby a series of individual strips is formed, comprising a severing device adapted to reciprocate in a plane perpendicular to the elongated strip, an actuation circuit adapted to move the severing device to sever off the end of the strip, means operated by said severing device to open said actuation circuit, means to reset the severing device to the non-actuated position when said actuation circuit is open, first contact means connected in said actuation circuit and having a closed circuit position allowing completion of the actuation circuit and having an open circuit position preventing completion of the actuation circuit, a control means including contact means in said actuation circuit and adapted to complete the actuation circuit when energized, said control means being operatively associated with said first contact means to move the first contact means to closed circuit position when energized, an electromagnetic detector connected to the control means and disposed adjacent the path of the incoming elongated strip and having a first output condition in the presence of the elongated strip to energize the control means and having a second output condition in the absence of the elongated strip to de-energize the control means, and means to move the severed strip away from the incoming elongated strip to provide an air gap to the electromagnetic detector whereby the shearing machine is reset to stand by for actuation in response to predetermined inward movement of the elongated strip.

8. In combination, shearing means having a vertically moving cutting means and electrically controlled operating means, feed means continuously biasing an elongated metal strip through the shearing means in a horizontal plane, stop means disposed in the path of incoming strip to position the strip with respect to the shearing means during the shearing operation, conveyor means disposed immediately inwardly of the shearing means and adapted to support the strip and frictionally engage the strip to withdraw the individual strip formed by actuating the cutting means more rapidly than the feed of the incoming strip to provide an air gap therebetween, an electromagnetic detector disposed between the stop means and the shearing means and establishing an actuating signal in the presence of the strip, time delay means connected to the electromagnetic detector and operated during the period of said actuating signal, said time delay means connected to actuate the shearing means after a predetermined time commensurate with the abutment of the strip and said stop means, and a member engaging the upper surface of the formed individual strip to bias the strip toward the conveyor means and thereby substantially prevent slippage between the strip and the conveyor means to insure formation of the air gap between the continuous strip and the lamination.

9. In combination, shearing means having a vertically moving cutting means and electrically controlled operating means, feed means continuously biasing an elongated metal strip through the shearing means in a horizontal plane, a stop disposed in the path of the elongated incoming strip to position the strip with respect to the shearing means during the shearing operation, a conveyor disposed immediately inwardly of the shearing means and adapted to support the strip and frictionally engage the strip to withdraw the individual strip formed by actuation of the cutting means more rapidly than the feed of the incoming strip to provide an air gap therebetween, an electromagnetic detector located between the stop and shearing means and establishing an actuating signal in the presence of the strip, said electromagnetic detector being disposed below the incoming strip to bias the strip onto the conveyor means and thereby insure a more rapid movement of the sheared lamination from the apparatus than the movement of the incoming strip into the machine, and a time delay means connected to the electromagnetic detector and operated during the period of said actuating signal, said time delay means connected to actuate the shearing means after a predetermined time commensurate with the abutment of the strip and said stop means, and a member engaging the upper surface of the formed individual strip to bias the strip toward the conveyor means and thereby substantially prevent slippage between the strip and the conveyor means to insure formation of said air gap between the elongated strip and the lamination.

10. In combination for forming a series of laminations from a continuous metal strip, shearing means, feed means to continuously bias the metal strip toward the shearing means, stop means disposed in spaced relation to said shearing means and adapted to be engaged by the end of the continuous strip to position the strip for shearing, a punch mounted midway between said shearing means and said stop means, electrically controlled operating means to simultaneously actuate said shearing means and said punching means, a magnetic core disposed intermediate said stop means and said punch and adjacent the upper surface of said strip, a guide disposed between the strip and the rear edge portion of said core to prevent contact to said strip and said core, a first winding disposed on said core and adapted to be connected to a source of alternating current, a second winding disposed on said core to provide an electrical signal in proportion to the magnetic coupling with the first winding, said signal being greater in the presence of said metal strip, an electronic trigger circuit having a bias voltage connected in series with said signal voltage to effect conduction through the trigger circuit in the presence of the strip and to stop conduction through the trigger circuit in the absence of the strip, an electronic time delay circuit actuated by the conduction of the trigger circuit and operatively associated with the shearing means and the punching means to actuate the electrically controlled operating means, and a conveyor adapted to receive a lamination as formed and to longitudinally advance the lamination with respect to the metal strip at a faster rate than the longitudinal advance of the incoming continuous strip to provide an air gap to said core whereby said signal voltage returns to non-actuating level and said electronic time delay circuit is reset.

11. In a shearing machine adapted to continuously receive a long metallic strip and adapted to successively shear off the end of the strip to form individual strips, a knife movably mounted for longitudinal movement with respect to said strip and adapted to sever the strip, a stop means disposed inwardly of the shear means and in the path of the strip, means to longitudinally move the knife with respect to the stop means whereby a series of individual strips of varying lengths are produced, time delay means connected to actuate said knife to sever the end of the elongated strip, an electromagnetic detector disposed between the knife and the stop means and responsive to the presence of the strip to initiate actuation of the time delay means to sever off the end of the elongated strip incident to engagement of the strip and stop means, and means responsive to operation of the knife to remove the stop means from the path of the strip.

12. In automatic shearing apparatus adapted to form a series of individual strips from a continuous strip of an indefinite length by successively cutting off the end of the continuous strip, a shear means adapted to cut off the end of the continuous strip, an electromagnetic sensing means having a first output state in the absence of the continuous strip and having a second output state in the presence of the continuous strip, operating circuit means connected to the sensing means and the shear means and energized by the second output state to actuate the shear means in the presence of the strip, said circuit means including resettable switch means responsive to a single cycle of the shear means to de-energize said operating circuit, said switch means being reset by said first output state of the sensing means to permit a subsequent shearing cycle, and means to longitudinally advance the immediate formed individual strip more rapidly than the advance of the incoming continuous strip to provide a resetting air gap to the sensing means and thereby establishing said first output state in the sensing means.

13. In automatic shearing apparatus adapted to form a series of individual strips from a continuous strip of an indefinite length by successively cutting off the end of the continuous strip, a shear means adapted to cut off the end of the continuous strip, an electromagnetic sensing means having a first output state in the absence of the continuous strip and having a second output state in the presence of the continuous strip, operating circuit means connected to the sensing means and the shear means and energized by the second output state to actuate the shear means in the presence of the strip, said circuit means including resettable switch means responsive to a single cycle of the shear means to de-energize said operating circuit, said switch means being reset by said first output state of the sensing means to permit a subsequent shearing cycle, a belt type conveyor adapted to longitudinally advance the immediately formed strip more rapidly than the advance of the incoming continuous strip to provide a resetting air gap to the sensing means and thereby establishing said first output state in the sensing means, and a biasing roller mounted to bias the strip onto the conveyor and thereby prevent slippage between the formed strip and the conveyor to insure formation of said air gap.

14. In automatic shearing apparatus adapted to form a series of individual strips from a continuous strip of an indefinite length by successively cutting off the end of the continuous strip, a shear means adapted to cut off the end of the continuous strip, an electromagnetic sensing means having a first output state in the absence of the continuous strip and having a second output state in the presence of the continuous strip, operating circuit means connected to the sensing means and the shear means and energized by the second output state to actuate the shear means in the presence of the strip, said circuit means including resettable switch means responsive to a single cycle of the shear means to de-energize said operating circuit, said switch means being reset by said first output state of the sensing means to permit a subsequent shearing cycle, a belt type conveyor adapted to longitudinally advance the immediately formed strip more rapidly than the advance of the incoming continuous strip to provide a resetting air gap to the sensing means and thereby establishing said first output state in the sensing means, and a biasing roller and said electromagnetic sensing means having means adapted to establish an electromagnetic field biasing the immediate formed lamination onto the conveyor and thereby preventing slippage of the immediate formed lamination to insure formation of said air gap.

15. In an automatic shearing apparatus adapted to form a series of individual strips from a continuous strip of an indefinite length by successively cutting off the end of the continuous strip, means to longitudinally feed the strip, a shear means adapted to cut off the end of the continuous strip, a pair of transversely spaced endless belts adapted to longitudinally advance the immediate formed strip more rapidly than the advance of the incoming strip, a transformer disposed between the belts and immediately adjacent the undersurface of the strip, said transformer including a primary winding adapted to be connected to a source of power to establish a magnetic field and a secondary winding having a first output state in the absence of the continuous strip and having a second output state in the presence of the continuous strip, said magnetic field biasing the strip onto the conveyor belts to prevent slippage between the immediate formed strip and the belts to insure formation of said air gap, operating circuit means connected to the shear means and in circuit with the secondary winding and energized by the second output state to actuate the shear means in the presence of the strip, a resettable switch means in the operating circuit and responsive to each cycle of the shear means to de-energize the operating circuit, and control means connected in circuit to said secondary winding and operatively associated with said resettable switch means to reset the switch means in response to said first output state.

References Cited in the file of this patent

UNITED STATES PATENTS

| 2,369,617 | Somerville | Feb. 13, 1945 |
| 2,581,960 | Kronenwetter | Jan. 8, 1952 |
| 2,587,631 | Kuehne | Mar. 4, 1952 |
| 2,655,994 | Vandenberg | Oct. 20, 1953 |
| 2,749,981 | MacKinnon | June 12, 1956 |
| 2,751,150 | Buccicone | June 19, 1956 |
| 2,779,407 | Thomsen | Jan. 20, 1957 |